US008923816B2

United States Patent
Lee et al.

(10) Patent No.: US 8,923,816 B2
(45) Date of Patent: Dec. 30, 2014

(54) APPARATUS AND METHOD FOR PROVIDING SEAMLESS SERVICE BETWEEN A CELLULAR NETWORK AND WIRELESS LOCAL AREA NETWORK FOR A MOBILE USER

(75) Inventors: Chahng Hwahn Lee, Plano, TX (US); Joon-Gil Park, Carrolton, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 350 days.

(21) Appl. No.: 13/552,121

(22) Filed: Jul. 18, 2012

(65) Prior Publication Data

US 2013/0029639 A1 Jan. 31, 2013

Related U.S. Application Data

(60) Provisional application No. 61/512,716, filed on Jul. 28, 2011.

(51) Int. Cl.
*H04M 1/68* (2006.01)
*H04W 12/06* (2009.01)
*H04W 92/02* (2009.01)
*H04W 76/02* (2009.01)
H04W 36/14 (2009.01)
H04W 88/06 (2009.01)

(52) U.S. Cl.
CPC .............. *H04W 12/06* (2013.01); *H04W 92/02* (2013.01); *H04W 76/022* (2013.01); *H04W 36/14* (2013.01); *H04W 88/06* (2013.01)
USPC ........... 455/411; 370/328; 370/331; 370/352; 370/401

(58) Field of Classification Search
USPC ............ 455/410–411, 432.1–435.3; 370/285, 370/328–338, 352–356, 401
See application file for complete search history.

(56) References Cited

U.S. PATENT DOCUMENTS

| | | | | |
|---|---|---|---|---|
| 6,424,638 B1 * | 7/2002 | Ray et al. | ........................ | 370/331 |
| 6,839,339 B1 * | 1/2005 | Chuah | ............................ | 370/349 |
| 7,155,526 B2 * | 12/2006 | Chaudhary et al. | ............ | 709/229 |
| 7,394,795 B2 * | 7/2008 | Chitrapu et al. | ............... | 370/338 |
| 7,471,655 B2 * | 12/2008 | Gallagher et al. | ............. | 370/329 |
| 7,542,455 B2 * | 6/2009 | Grayson et al. | ................ | 370/338 |
| 7,606,190 B2 * | 10/2009 | Markovic et al. | .............. | 370/328 |
| 7,974,270 B2 * | 7/2011 | Goel et al. | ..................... | 370/352 |
| 8,045,542 B2 * | 10/2011 | Lappalainen | .................. | 370/352 |
| 8,432,893 B2 * | 4/2013 | Chitrapu et al. | ............... | 370/351 |
| 8,495,714 B2 * | 7/2013 | Jones et al. | ......................... | 726/5 |
| 8,538,433 B2 * | 9/2013 | Kekki et al. | .................... | 455/436 |
| 8,676,159 B1 * | 3/2014 | Shu et al. | ........................ | 455/410 |

* cited by examiner

*Primary Examiner* — Sharad Rampuria
(74) *Attorney, Agent, or Firm* — Jefferson IP Law, LLP

(57) ABSTRACT

A wireless communication system including a cellular network and a Wireless Local Area Network (WLAN) providing cellular network services via the WLAN is provided. The system includes a Radio Access Network (RAN) providing the cellular network, a WLAN Access Point (AP) providing the WLAN, a Mobile Switching Center/General Packet Radio Service (GPRS) Support Node (MSC/GSN) providing a connection to a core network, a gateway connecting the WLAN AP to the MSC/GSN, and a User Equipment (UE) accessing both the cellular network provided by the RAN and the WLAN provided by the WLAN AP, the UE including a cellular communications unit including a cellular network protocol interface, a Frame Relay Switch (FRS), and a cellular modem, and a WLAN communications unit including a WLAN modem and a Radio Control Agent (RCA), wherein the RCA provides a communications tunnel between the cellular communications unit and a gateway of the WLAN.

19 Claims, 6 Drawing Sheets

APPARATUS AND METHOD FOR PROVIDING SEAMLESS SERVICE BETWEEN A CELLULAR NETWORK AND WIRELESS LOCAL AREA NETWORK FOR A MOBILE USER

CROSS-REFERENCE TO RELATED APPLICATIONS

This application claims the benefit under 35 U.S.C. §119 (e) of a U.S. Provisional application filed on Jul. 28, 2011 in the U.S. Patent and Trademark Office and assigned Ser. No. 61/512,716, the entire disclosure of which is hereby incorporated by reference.

BACKGROUND OF THE INVENTION

1. Field of the Invention

The present invention relates to an apparatus and method for providing seamless service between a cellular network and a Wireless Local Area Network (WLAN) for a mobile user. More particularly, the present invention relates to an apparatus and method for providing cellular network services using the WLAN seamlessly.

2. Description of the Related Art

Mobile terminals provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and other similar functions provided on portable electronic devices. With the plurality of features and functions now provided, mobile terminal users consume increasing amounts of wireless communication services provided by a cellular communication system.

Accordingly, a cellular radio spectrum, which is used for providing the wireless communication services noted above, is limited, and thus the cellular radio spectrum provides a limited amount of cellular resources for the increasing amounts of wireless traffic. To address the limited cellular resources, recent research and development has been directed towards providing greater amounts of wireless resources for mobile end users and User Equipments (UEs) using cellular resources. For example, research has been conducted on providing Institute for Electrical and Electronics Engineers (IEEE) 802.11 or Wireless-Fidelity (Wi-Fi) networks operating in conjunction with, or on top of, cellular networks in order to decrease an amount of cellular resources used by UEs. Accordingly, a brief description of cellular networks and the operation of cellular networks is provided below.

FIG. 1A illustrates a control plane of a cellular network according to the related art. FIG. 1B illustrates a user plane of a cellular network according to the related art.

Referring to FIGS. 1A and 1B, in a wireless communication system using the cellular radio spectrum, i.e., a cellular radio network or cellular network, a UE is connected to a Radio Access Network (RAN) through a cellular radio link, and the RAN is connected to a core network, which may include, a Base Station (BS), a Mobile Switching Center (MSC), General Packet Radio Service (GPRS) Support Node (GSN), or other similar items and elements included in a core network. The RAN uses a radio resource allocation procedure in order to establish a radio link. The cellular network system, which is operated on the RAN, is composed of two planes, a control plane 101 for interconnecting network elements for signaling, as shown in FIG. 1A, and a user plane 201 for interconnecting network elements for data, such as voice data, graphics data, and other similar user data, as shown in FIG. 1B.

In further detail, the RAN, which may also be referred to as a BS Subsystem (BSS), may be composed of at least one Node-B as a radio transceiver that provides a radio cell unit, and a Radio Network Controller (RNC), which controls the at least one Node-B. Accordingly, the RAN provides the UE access to the RAN by controlling connections between the UE and the RAN. For example, a Non-Access Stratum (NAS) 102 is a top layer of a protocol interface between the UE and the core network via an MSC and/or GSN, and provides call and data session setup as well as management of the UE in order to manage the entry, exit and handover of the UE.

Additionally, the NAS 102 may provide a Circuit Switched (CS) call service and a Packet Switched (PS) data service between the UE and the core network via the RAN. Radio Resource Control (RRC) 103 is a layer disposed below the NAS 102, and the RRC 103 provides radio resource control between a UE and the RAN. Particularly, the RRC 103 provides a negotiation of radio resources between the UE and the RAN in order to establish a radio connection, wherein during the negotiation, both the UE and the RAN exchange radio parameters and states through the RRC 103 protocol interface. Additionally, the RRC 103 provides connection and mobility management by establishing and tearing down connections while the UE roams among a cell, monitors and controls a radio condition by determining a radio link quality of a cell in which the UE is roaming in or disposed, and manages connection states with the RAN.

Radio Link Control (RLC) 104 provides communication between the RRC 103, or other similar upper layers such as Broadcast/Multicast Control (BMC) and Packet Data Convergence Protocol (PDCP), and logical channels of the wireless communication system. More particularly, the RLC 104 provides frame transmission between the UE and the RAN. Accordingly, the RLC 104 performs segmentation and reassembly of data transmitted between the UE and the RAN, performs error detection and recovery, and may perform ciphering and deciphering of control messages sent between the UE and the RAN. The RLC 104 may operate in three modes, an Acknowledged Mode (AM), a Transparent Mode (TM), and an Unacknowledged Mode (UM) according to a desired control of signaling and traffic data between the UE and RAN.

Furthermore, Media Access Control (MAC) 105 maps logical channels to transport channels of the Physical layer. The MAC 105 performs multiplexing of logical channel data and is responsible for managing a Hybrid Automatic Repeat Request (HARQ) function. The MAC 105 also performs priority handling of the data flows, such that, when there are multiple transmission sessions, the MAC 105 handles dynamic scheduling of transmissions for each session so that higher priority data transmissions receive a corresponding priority. The MAC 105 may also perform traffic volume monitoring and may provide ciphering and deciphering of voice data.

Referring to FIG. 1B, the user plane includes the RLC 104 and the MAC 105, among other layers and features, which will not be described herein for the purpose of brevity. Additionally, the RLC 104 and the MAC 105 of the user plane of FIG. 1B are similar to the RLC 104 and the MAC 105 as described with reference to the control plane illustrated in FIG. 1A. Additionally, a UE may use CS services for transmission of voice frames such that a frame is sent every 20 ms, i.e., at a rate of 50 frames per second, via the RLC 104 and the MAC 105. The voice frame may be sent from the UE to the core network via the RAN by using the RLC 104 and the MAC 105, which dynamically determine transport options for each transmission according to a configuration set determined during the radio resource allocation stage. The UE may also use PS services for transmission of data packets in a periodic mode, a burst mode, or another suitable transmission mode, that is selected by the RLC 104 and the MAC 105 according to a configuration set determined during the radio resource allocation stage. The data packets are transmitted from the UE to the RAN using a Packet Data Convergence Protocol (PDCP), and the RAN converts the PDCP into General Packet Radio Service (GPRS) Tunneling Protocol (GTP) in order to relay the data packets to the core network.

FIG. 2 illustrates a signal flow for a voice call originated by a UE according to the related art.

Referring to FIG. 2, a wireless communication system includes a MSC/GSN 201, a RNC 202, a Node-B 203 and a UE 204. In order to perform a voice call originated from the UE 204, at step 205, the UE 204 transmits an RRC connection request message to the RNC 202 via the Node-B 203 in order to request a radio resource allocation. Next, at step 206, the RNC 202 allocates traffic channel radio resources for the UE 204 and sends a command to the Node-B 203 to setup a physical radio resource for the UE 204, after which, the Node-B 203 and the RNC 202 may perform a low layer synchronization process for the new traffic channel. Next, in step 207, the RNC 202 transmits an RRC Connection Setup message to the UE 204 when the RNC 202 and the Node-B 203 have prepared the radio resource in order to inform the UE 204 that the radio resource assignment has been completed.

Upon receiving the RRC connection setup message, the UE 204 selects or tunes to the radio resource prepared by the RNC 202 and the Node-B 203 in order to establish a radio link with the Node-B 203. Next, in step 208, upon detecting that the UE 204 has established a radio link, the Node-B 203 transmits a Node-B Application Part (NBAP) Radio Link Restore Indication message to the RNC 202. Next, in step 209, the UE 204 transmits a RRC connection setup complete message to the RNC 202, and then, in step 210 the RNC 202 sends an RRC Measurement Control message to the UE 204 initiate reporting of the link status between UE 204 and the RAN. Next, in step 211, the UE 204 transmits an Initial Direct Transfer-Connection Management service request message to start a NAS session procedure for initiating a call setup, and, upon receiving the service request message from the UE 204, the MSC/GSN 201 performs an authentication and ciphering process between UE 204 and the MSC/GSN 201.

Next, in step 212, the UE sends Direct Transfer-Call Control (DT-CC) setup message to the MSC/GSN 201, which then allocates a voice circuit from a digital trunk between the RNC 202 and the MSC/GSN 201. Next, in step 213, the MSC/GSN 201 transmits a DT-Radio Bearer Assignment message to inform the RNC 202 about the allocated voice circuit, and the call is then switched from a signaling mode to a voice mode. In step 214, the connection between the Node-B 203 and the RNC 202 is switched from a signaling mode to a voice call mode. Next, in step 215, the RNC 202 transmits a RRC-Radio Bearer Setup message to the Node-B 203 in order to request the Node-B 203 to perform the mode change for the traffic channel through a NBAP-Radio Link Reconfigure Preparation (NBAP-RLRP) message and also notifies the UE about the mode change through the NBAP-RLRP message. Next, in step 216, when a destination for the call, i.e., a peer, accepts the call, then the MSC/GSN 201 sends a DT-CC Connect message to the UE 204. Accordingly, the UE 204, may originate and connect a voice call.

Furthermore, the mobile communication system may include a femtocell for providing additional and/or extended wireless coverage for UEs. A femtocell has an approximate coverage area of 100 feet, and uses similar technology as described with reference to FIGS. 1A, 1B, and 2. In other words, the femtocell may use a cellular protocol interface via a cellular radio modem, thus using the control plane of FIG. 1A and the user plane of FIG. 1B, and thus may interoperate with the elements of the wireless communication system of FIG. 2. However, the femtocell has several disadvantages, wherein, because the femtocell operates on a cellular radio frequency band, it may cause radio interference with neighboring macro BSs. Additionally, each femtocell is determined to be one radio cell, thus when deployed widely in large numbers, each having an approximate coverage area of 100 feet, use of femtocells increases an amount of configuration and management of a wireless communication system. Accordingly, although use of femtocells may increase for certain applications, such as providing coverage in cellular network shadows or high density locations, large scale deployment of femtocells increases cost as well as configuration and management complexity of wireless communication systems.

Additionally, in order to provide increased amounts of bandwidth to UEs, cellular network providers have implemented Unlicensed Mobile Access (UMA), which may also be referred to as Generic Access Network (GAN), in order to extend voice, data, and Internet Protocol (IP) services of the cellular network providers. UMA is a different protocol interface than that of the cellular network or wireless communication system described with reference to FIGS. 1A, 1B, and 2. However, UMA provides similar functionality as the above described wireless communication system and may operate using an unlicensed network, such as a Wireless Local Area Network (WLAN) that does not use the cellular radio frequency band. Accordingly, UMA does not require installation of additional radio access system hardware in a cellular wireless communication system, while providing seamless services between a cellular network and a WLAN network.

However, because UMA is a protocol interface operating in conjunction with a cellular network, UMA may not provide all radio communication features that a cellular network provides. Accordingly, UMA may not operate reliably in complicated and unreliable radio network environments, such as a cellular network, and thus, may not provide stable and reliable voice and data services and may not provide the robustness or number of functions available via a cellular network. Additionally, because UMA is a different protocol interface than that of a cellular network, deployment of UMA in a cellular network includes providing a gateway for translating the UMA protocol into the cellular network protocol, thus, increasing a cost and complexity of cellular network implementing UMA. Furthermore, because of the necessary translation between the UMA protocol and the cellular protocol, changes to a cellular protocol or deployment of a new cellular protocol may require a corresponding change to the UMA protocol and a corresponding UMA gateway in order to provide a translation between the UMA protocol and the new cellular protocol interface. Due to the foregoing complexities and problems with UMA deployment, many operators are either discontinuing deployment of, or limiting the usage of, UMA. Accordingly, there is a need for an apparatus and method for providing an improved WLAN access or UMA seamlessly through a cellular protocol interface.

SUMMARY OF THE INVENTION

Aspects of the present invention are to address at least the above-mentioned problems and/or disadvantages and to provide at least the advantages described below. Accordingly, an aspect of the present invention is to provide an apparatus and method for providing seamless service between a cellular network and a Wireless Local Area Network (WLAN) for a mobile user, and more particularly, the present invention relates to an apparatus and method for providing cellular network services using the WLAN seamlessly.

In accordance with an aspect of the present invention, a method for providing a voice call service for a cellular network seamlessly through a Wireless Local Area Network (WLAN), the WLAN including a WLAN Access Point (AP) and a gateway, to a User Equipment (UE) having a Frame Route Switch (FRS) and a Radio Control Agent (RCA) is provided. The method includes performing a cellular network resource assignment by the RCA of the UE after receiving a radio resource request message from the FRS of the UE, transmitting, via a gateway of the WLAN to which the RCA is connected, an initial Direct Transfer (DT)-Connection Management (CM) service request from the FRS to a Mobile Switching Center/General Packet Radio Service (GPRS) Support Node (MSC/GSN), in order to request call setup with the cellular network, executing an authentication and security procedure between the FRS and the MSC/GSN via the gateway of the WLAN, provisioning a voice trunk, by the MSC/GSN, for a voice call from the UE using the cellular network, transmitting, from the MSC/GSN to the gateway of the WLAN, a radio bearer assignment request message for requesting the gateway to open a voice trunk between the gateway and the MSC/GSN, transmitting, from the gateway to the RCA, the radio bearer assignment request message to the RCA in order to switch a connection between the RCA and the gateway from a signaling mode to a voice mode, transmitting, from the RCA to the FRS, a radio bearer setup message, upon receiving the radio bearer assignment request message from the gateway, transmitting, from the FRS to the RCA, a radio bearer setup complete message, and transmitting, from the RCA to the MSC/GSN via the gateway, a DT radio bearer assignment complete message in order to complete the voice call setup signaling and to establish the voice call connection.

In accordance with another aspect of the present invention, a User Equipment (UE) providing cellular communications services via a Wireless Local Area Network (WLAN) is provided. The UE includes a cellular communications unit including a cellular network protocol interface, a Frame Relay Switch (FRS), and a cellular modem, and a WLAN communications unit including a WLAN modem and a Radio Control Agent (RCA), wherein the RCA provides a communications tunnel between the cellular communications unit and a gateway of the WLAN.

In accordance with another aspect of the present invention, a wireless communication system including a cellular network and a Wireless Local Area Network (WLAN) providing cellular network services via the WLAN is provided. The system includes a Radio Access Network (RAN) providing the cellular network, a WLAN Access Point (AP) providing the WLAN, a Mobile Switching Center/General Packet Radio Service (GPRS) Support Node (MSC/GSN) providing a connection to a core network of the cellular network, a gateway connecting the WLAN AP to the MSC/GSN, and a User Equipment (UE) accessing both the cellular network provided by the RAN and the WLAN provided by the WLAN AP, the UE including a cellular communications unit including a cellular network protocol interface, a Frame Relay Switch (FRS), and a cellular modem, and a WLAN communications unit including a WLAN modem and a Radio Control Agent (RCA), wherein the RCA provides a communications tunnel between the cellular communications unit and a gateway of the WLAN.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for providing seamless service between a cellular network and a Wireless Local Area Network (WLAN) for a mobile user. More particularly, the present invention relates to an apparatus and method for providing cellular network services using the WLAN seamlessly.

Figure 1A:
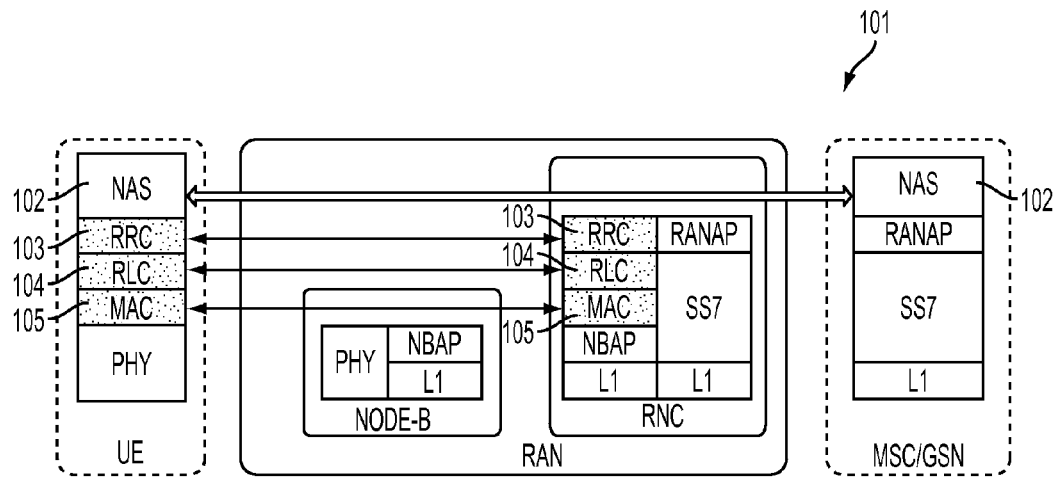
FIG. 1A illustrates a control plane of a cellular network according to the related art.
Figure 1B:
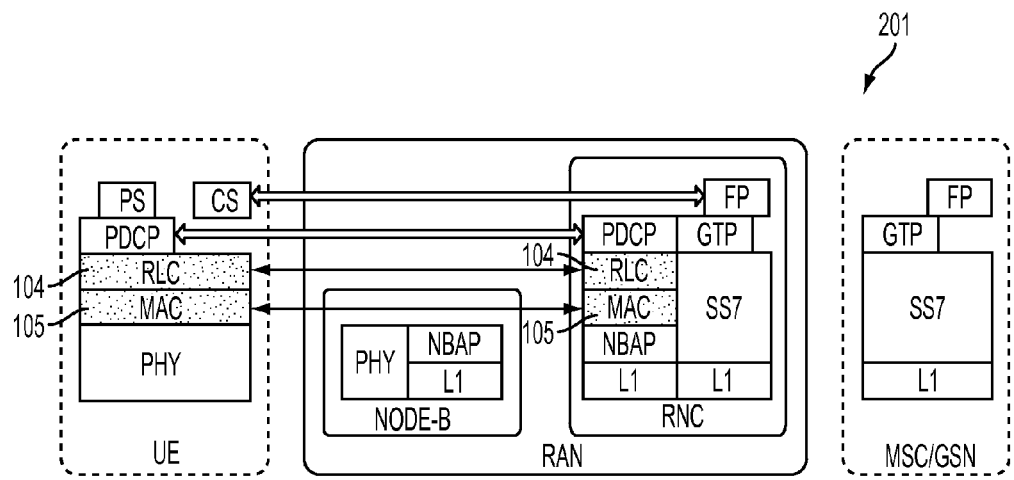
FIG. 1B illustrates a user plane of a cellular network according to the related art.
Figure 2:
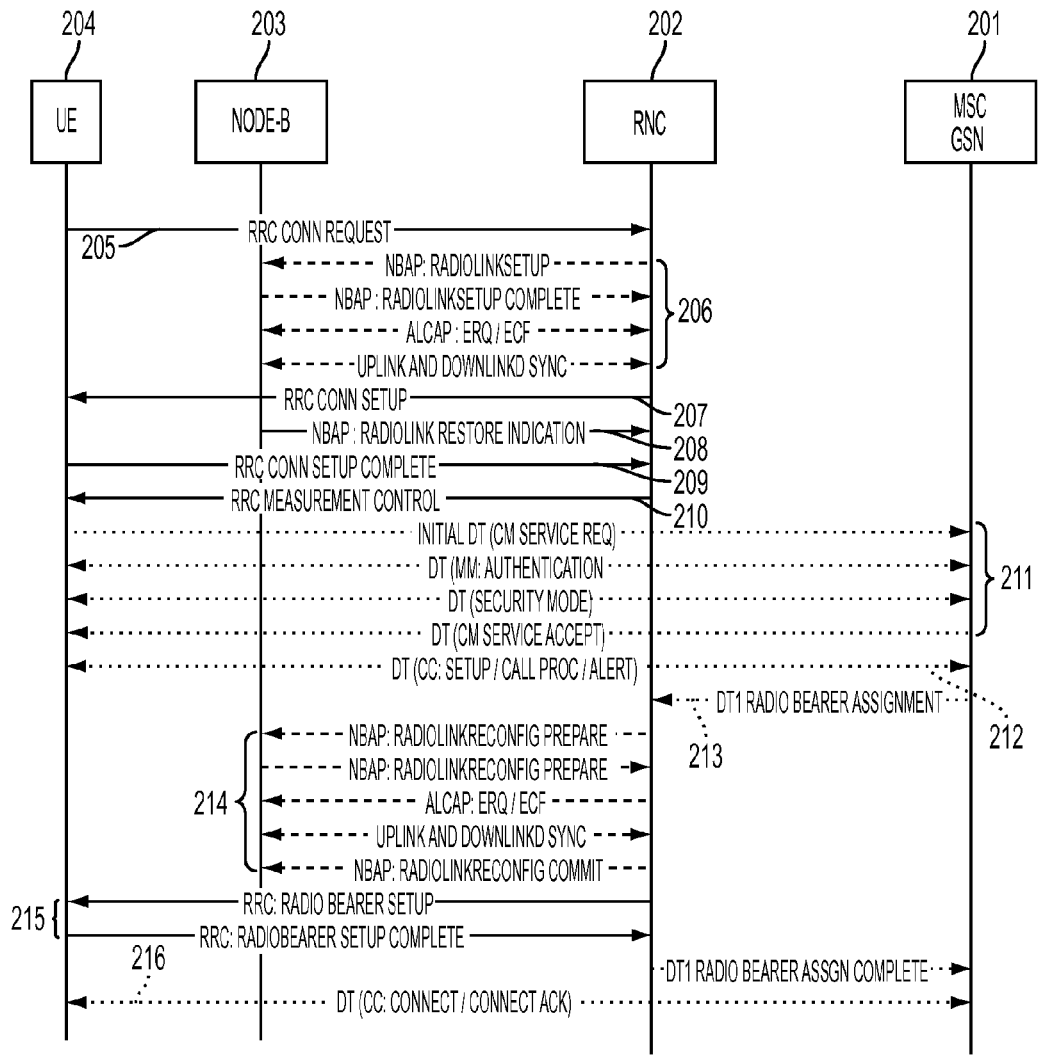
FIG. 2 illustrates a signal flow for a voice call originated by a User Equipment (UE) according to the related art.
Figure 3:
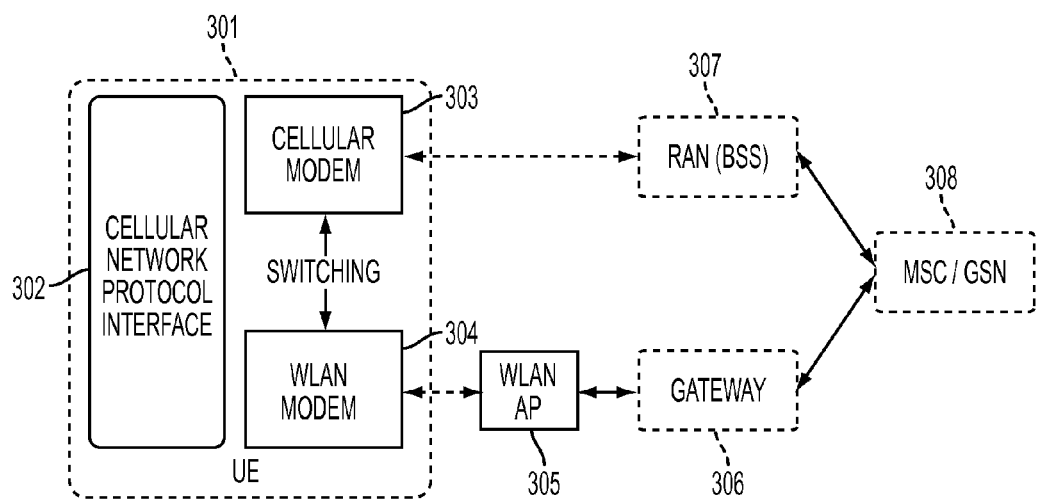
FIG. 3 illustrates a UE in a cellular network and a Wireless Local Area Network (WLAN) according to an exemplary embodiment of the present invention.

FIG. 3 illustrates a User Equipment (UE) in a cellular network and a WLAN according to an exemplary embodiment of the present invention.

Referring to FIG. 3, a UE 301 includes a cellular network protocol interface 302 to communicate with a Mobile Switching Center (MSC)/General Packet Radio Service (GPRS) Support Node (GSN) 308 via cellular resources between a cellular modem 303 of the UE 301 and a Radio Access Network (RAN) 307 providing cellular resources to the UE 301. In the present exemplary embodiments of the present invention, and hereinbelow, a UE may be anyone of a cellular phone, a mobile terminal, a mobile electronic device, a Personal Digital Assistant (PDA), a tablet computer, a portable and/or laptop computer, a Portable Media Player (PMP), or any other similar portable electronic device that has a wireless communication function. The UE 301 may also communicate with the WLAN using the cellular network protocol interface 302 via WLAN modem 304, such as an Institute for Electrical and Electronics Engineer (IEEE) 802.11 modem, that connects to a WLAN Access Point (AP) 304 using Wireless-Fidelity (Wi-Fi) resources. In further detail, the UE 301 may switch between the cellular modem 303 and the WLAN modem 304 in order to switch between respective physical layers of the cellular network and the Wi-Fi network while communicating using the cellular network protocol interface 302.

In a case where the UE 301 is connected to the cellular network via the cellular modem 303, the UE 301 will communicate with the MSC/GSN 308 using the cellular network protocol interface 302. In such a case, it may be determined that the cellular network conditions are poor, and that the UE 301 would receive better wireless connectivity via the Wi-Fi network. Accordingly, if the WLAN modem 304 is turned on, then the UE 301, which was previously using the cellular modem 303 for radio communications, switches to the WLAN modem 304 for radio communications over the WLAN, and continues to interoperate with the cellular core network, i.e., the MSC/GSN 308, using the cellular network protocol 302. In order for the communications between the WLAN modem 304 and the WLAN AP 305 to be transported to the MSC/GSN 308, a gateway 306 is disposed between the UE 301 and the MSC/GSN 308 so as to provide seamless connectivity between the WLAN and the cellular network.

Although not shown in FIG. 3, in order to provide the seamless connectivity, the UE 301 may include a Frame Route Switch (FRS) and a Radio Control Agent (RCA) that translate the cellular network protocol interface 302 into a protocol used by the WLAN. Thus, in the present exemplary embodiment of FIG. 3, with the addition of the FRS and the RCA in the UE 301 and the gateway 306, the cellular network protocol interface 302 architecture in the UE 301 is not modified heavily, thus, allowing for a simplified implementation of seamless connectivity between the WLAN and the cellular network and in order to minimize maintenance of the system.

Because the major role of the gateway is only to support a standard protocol interface with a core network, the logic complexity in a gateway is low, and thus the implementation and maintenance for the gateway will be very limited. However, the control plane and the user plane according to present exemplary embodiments are described below in further detail with reference to the UE 301, the WLAN AP 305, the gateway 306, the RAN 307, and the MSC/GSN 308, as discussed above.

Figure 4A:
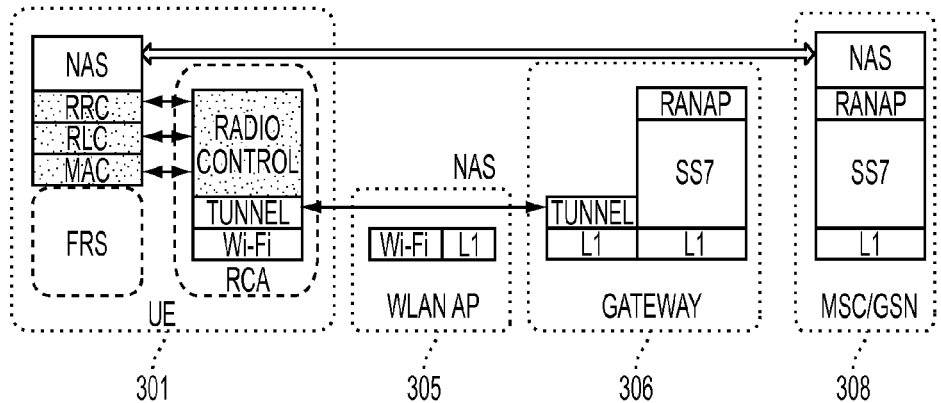
FIG. 4A illustrates a control plane protocol interface according to exemplary embodiments of the present invention.

FIG. 4A illustrates a control plane protocol interface according to exemplary embodiments of the present invention.

Referring to FIG. 4A, a UE 301, a WLAN AP 305, a gateway 306, and an MSC/GSN 308 are interconnected in a wireless communication system providing service to the UE 301. In further detail, the UE 301 is connected to the gateway 306 via RCA over a WLAN through the WLAN AP 305, wherein a communication channel between the UE 301 and the gateway 306 is established through tunneling over the WLAN. Accordingly, in order to provide the tunnel to the MSC/GSN 308, the gateway 306 has a connection with MSC/GSN 308 through a cellular protocol interface.

As shown in FIG. 4A, components of the cellular network protocol interface, such as the Radio Resource Control (RRC) interface, the Radio Link Control (RLC) interface, and the Media Access Control (MAC) interface terminate at a Radio Control Agent (RCA) in the UE 301. Accordingly, messages transmitted according to the above noted interfaces of the cellular network protocol interface, as originated by the UE 301, are not transmitted outside of or beyond the UE 301. Thus, a Non-Access Stratum (NAS) layer of the cellular network protocol interface is relayed to the gateway 306 using a tunnel between the UE 301 and the gateway 306 that is transmitted via the WLAN AP 305. The gateway 306 may further relay messages received using the tunnel to the MSC/GSN 308 using the Radio Access Network Application Part (RANAP) protocol, the BS Subsystem Management Application sub-Part (BSSMAP) protocol, or any other suitable protocol.

Figure 4B:
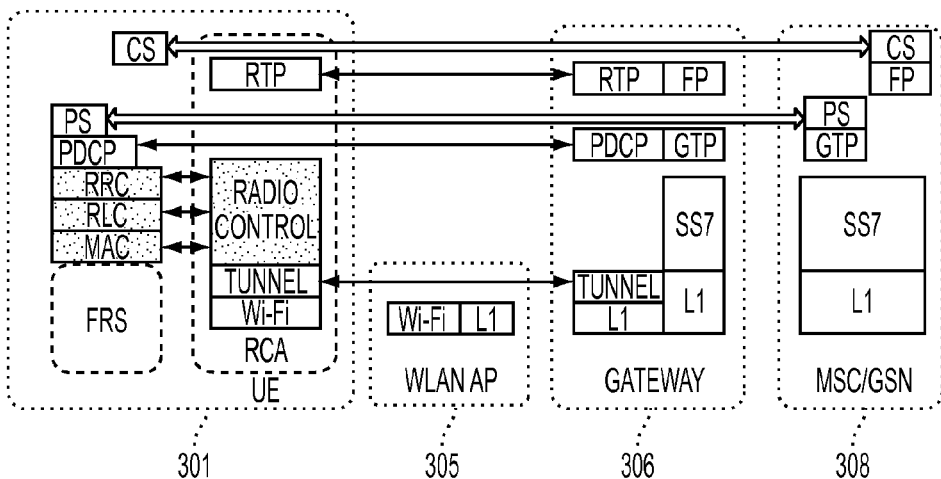
FIG. 4B illustrates a user plane protocol interface according to exemplary embodiments of the present invention.

FIG. 4B illustrates a user plane protocol interface according to exemplary embodiments of the present invention.

Referring to FIG. 4B, a UE 301 may execute a voice call using Circuit Switched (CS) services, and may execute a data call or use data services using Packet Switched (PS) services. In order to execute a voice call, a voice frame generated by the UE 301 is encapsulated in Real-time Transport Protocol (RTP) by the RCA of the UE 301. The voice frame is transported from the UE 301, via the WLAN AP 305, to the gateway 306. The gateway 306 sends the voice frame to the MSC/GSN 308 using Frame Protocol (FP), as shown in FIG. 4B. In the case of transmitting a data call or a data packet using data services, the UE 301 uses Packet Data Convergence Protocol (PDCP) to transmit the data packet through the RCA, wherein the PDCP is terminated at the gateway 306 after being relayed by the WLAN AP 305. The gateway 306 transmits the data packet to the MSC/GSN 308 using General Packet Radio Service (GPRS) Tunneling Protocol (GTP). According to another exemplary embodiment of the present invention, the PDCP may terminate at the RCA of the UE 301, and then the RCA may send raw packet data using any suitable transmission method to the gateway 306.

Figure 5:
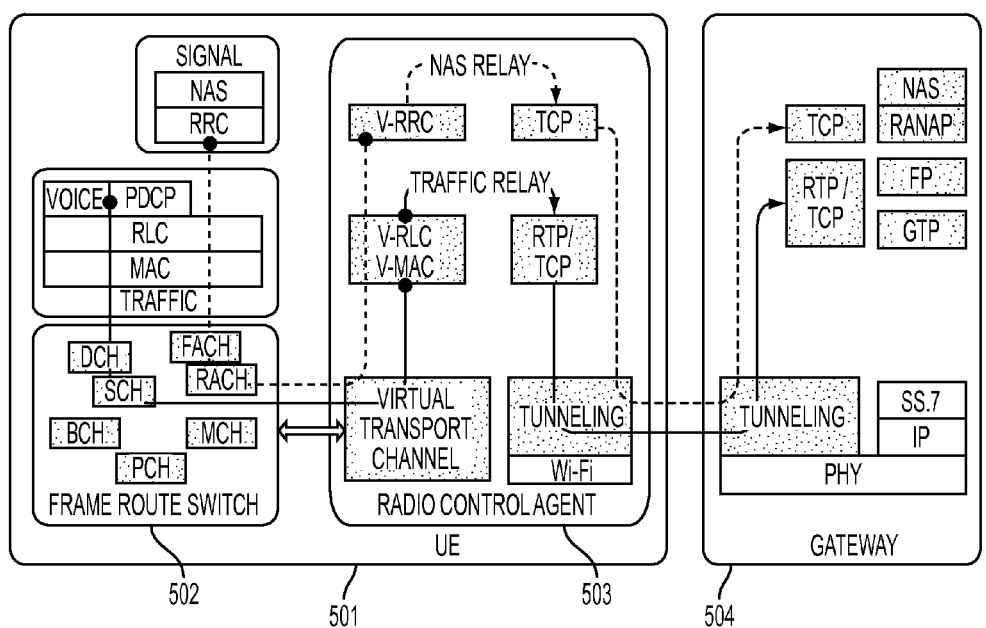
FIG. 5 illustrates a cellular network and a WLAN providing seamless service for a mobile user according to exemplary embodiments of the present invention.

FIG. 5 illustrates a cellular network and a WLAN providing seamless service for a mobile user according to exemplary embodiments of the present invention.

Referring to FIG. 5, a UE 501 includes a FRS 502 and a RCA 503. The FRS 502 detects a status of the WLAN link and provides routing of frames transmitted on a transport channel to a modem. More particularly, the FRS 502 may provide routing for frames that are transported using a Dedicated Channel (DCH), a Synchronization Channel (SCH), a Broadcast Channel (BCH), a Paging Channel (PCH), a Forward Access Channel (FACH), a Random Access Channel (RACH), a Multicast Channel (MCH), or other similar channels. In other words, the FRS 502 is disposed between the MAC layer and the physical layer so as to map the above noted transport layer channels to physical layer channels of the cellular network using a cellular radio or network modem, such as the cellular modem 303 (see FIG. 3). Alternatively, the FRS 502 may route the frames of the above noted the transport layer channels to a Virtual Transport Channel (VTC) in the RCA 503 for transport over the WLAN link. Accordingly, when the UE 501 transmits user data via the cellular radio network, using the cellular modem, the frames of the transport layer channels are mapped to cellular physical channels. Alternatively, when the UE 501 transmits user data via the WLAN, using the WLAN modem, or another similar or suitable WLAN modem, the frames of the transport layer channels are routed to the VTC in RCA 503.

The RCA 503 provides termination radio link control protocol interfaces, for protocols such as RRC, RLC, and MAC. Additionally, the RCA 503 relays NAS signaling and user data, i.e., user data traffic, to a core network via a gateway 505 via tunneling over the WLAN. Additionally, the RCA 503 relays NAS signaling and user data, i.e., user data traffic, to a core network via a gateway 505 using tunneling over the WLAN. For a UE, such as the UE 501, operating on a cellular network, the RRC layer provides a radio link setup procedure and the RLC and MAC layers are responsible for radio link communication between a UE and a RAN in cellular radio network. However, when the UE 501 operates on a WLAN, then the RCA 503 terminates the RRC, RLC, and MAC layers in order to provide a virtual radio link, such as the VTC, to the cellular protocol interface with predefined parameters. Accordingly, the RCA 503 relays cellular protocol interface data to the core network via a gateway 504, wherein the RCA 503 communicates with cellular protocol interface through the VTC in such that data packets from the UE 501 are transmitted to the gateway 504 using a tunnel provided through the WLAN.

Similar to the FRS 502, the RCA 503 monitors a status and condition of the WLAN link, and may determine a state of IP packet Quality of Service (QoS) when communicating with the gateway 504 in order to gather information used for controlling a decision regarding a handover or switching of the UE 501 between the WLAN and the cellular network. Additionally, the RCA 503 includes a protocol interface for Virtual-RRC (V-RRC), which performs RRC termination, which is initiated by the cellular protocol interface of the UE 501. For CS services, higher network protocol interfaces, such as NAS, are relayed to the core network so that the UE 501 and the core network may directly exchange information in order to setup a logical session including logical channels. For this operation, the V-RRC is also responsible for transporting the NAS signaling messages to the gateway 504. Additionally, the V-RRC responds to the RRC of the cellular protocol interface according to predefined parameters.

The RCA 503 also includes a protocol interface for Virtual-RLC (V-RLC), which responds to the RLC of the cellular protocol interface. The V-RLC is also responsible for extracting traffic frames, i.e., frames having user data, such as a voice frame, a PDCP frame for carrying an IP packet, or any other similar frame, and relaying the extracted traffic frames to the gateway 504 through RTP or through any suitable and reliable channel. Furthermore, the V-RLC responds to RLC of the cellular protocol interface according to predefined parameters. Additionally, the RCA 503 includes a protocol interface for Virtual-MAC (V-MAC), which responds to the MAC of the cellular protocol interface. The V-MAC is responsible for controlling a frame format and interacts with a VTC via the FRS 502, and the V-MAC responds to MAC of the cellular protocol interface according to predefined parameters.

In further detail, the VTC provides physical channel emulation for the RAN. When the UE 501 has link with the WLAN, then the VTC provides physical channel emulation for a respective transport channel of the MAC layer in the cellular protocol interface. The VTC provides a path between the gateway 504 and the UE 501 for each channel format, such that for the FACH and the RACH, the VTC provides a signaling channel frame, for the DCH and the SCH, the VTC provides a traffic channel frame, for the BCH, the VTC provides a broadcasting function, for PCH, the VTC provides a paging function, and for MCH, the VTC provides a multicasting channel frame.

The gateway 504 includes transport layer and physical layer interfaces for communicating with the core network, wherein the transport layer and physical layer interface comply with a communication standard or communication protocol which is used for the cellular protocol interface to communicate with the core network. The gateway 504 functions as an RNC, which interfaces with core network components, and provides standard cellular protocol interface with core network as well as with the MSC/GSN. The gateway 504 includes at least one of a RANAP or BSSMAP interface that relays direct messages, such as NAS signaling messages, between the UE 501 and the core network. For CS services, the gateway 504 includes a Frame Protocol (FP) interface for relaying voice traffic between the UE 501 and the core network. For PS services, the gateway 504 uses the GTP interface to relay user data traffic between the UE 501 and the core network, wherein the gateway 504 provides a tunneling service for each of the UEs, i.e., mobile terminals, that are connected to the WLAN. Additionally, the gateway 504 provides QoS feedback to the UE 501 when requested by the UE 501. In summary, the gateway 504 acts as or, in other words, emulates and represents a RAN or BS with respect to any UE connected to the core network via the gateway 504.

The UE 501, as noted above, may connect to both the cellular network and the WLAN. In a case where the UE 501 is connected to the cellular network via a cellular modem and simultaneously activates a WLAN modem of the UE 501, the WLAN modem establishes a link between the UE and a WLAN AP in order to be allocated an IP address from the WLAN AP. Upon being allocated an IP address, the UE 501 is considered to have joined the WLAN, and subsequently, the UE 501 may link to the gateway 504 using the WLAN provided by the WLAN AP. Accordingly, the UE 501 may communicate with the gateway 504 through a tunnel using GTP or another similar protocol. Before the WLAN modem is activated, the FRS of the UE 501 maps the above discussed transport channels to physical channels used by the cellular modem. Accordingly, when the UE 501 has joined the WLAN using the WLAN modem, the RCA 503 of the UE 501 provides notification of the link status to the FRS 502, and the FRS 502 switches all transport channel paths from the cellular radio modem to the VTC in the RCA 503. In such a case, the RCA 503 performs transport channel emulation.

In order to provide transport channel emulation, the RCA 503 also includes a protocol interface providing a V-RRC function, as noted above. Thus, when a user application executed on the UE 501 uses network resources, such as a voice call application or an internet browser application, then the UE 501 initiates a radio resource allocation procedure using the V-RRC protocol interface, and corresponding allocation data or messages are sent as a signaling frame to the user application through the RLC/MAC of the cellular network protocol interface. Next, the FRS 502 reroutes this signaling frame to VTC in the RCA 503. The VTC in the RCA 503 provides the transport channel emulation by calling back the upper layer V-MAC, V-RLC in the RCA 503 in order to relay the signaling frame via the NAS. As such, the signaling frame, provided via the RRC protocol interface message reaches the V-RRC of the RCA 503.

In the present exemplary embodiment, as shown in FIG. 5, rather than performing steps of a radio resource allocation procedure to establish radio link between the UE 501 and a RAN via the cellular radio link, the UE 501 may operate in the WLAN mode. Accordingly, because the UE 501 already has a radio resource and has joined the WLAN, V-RRC may be used such that the UE 501 does not perform the radio resource allocation procedure with the RAN. Furthermore, the V-RRC of the RCA 503 may respond to the RRC of the cellular protocol interface with preconfigured parameters in order to simplify implementation of the V-RRC. Furthermore, after completing the RRC procedure via the V-RRC, the UE 501 initiates a NAS signaling procedure with the core network. The UE 501 transmits NAS signaling messages from the cellular protocol interface of the FRS 502 to the V-RRC of the RCA 503, and the NAS signaling messages are then relayed to the gateway 504 using a communications channel, such as an IP tunnel.

The V-MAC of the RCA 503 provides responses to the MAC layer in the FRS 502, which has the cellular protocol interface. In a cellular radio network, the MAC is used to establish a radio link between the UE 501 and the RAN, and provides such functions as priority handling of data flows, traffic volume monitoring and Packet Data Unit (PDU) size setting, ciphering of voice data, and other similar functions provided by a MAC layer. Accordingly, the V-MAC of the RCA 503 directly interfaces with the MAC of the FRS 502, which is provided on a same system domain as the FRS 502 and the RCA 503 are co-located in the UE 501. Accordingly, rather than performing the above described functions between the UE 501 and the core network, such functions are not performed when the UE 501 operates using the WLAN. Accordingly, the MAC function of the cellular protocol interface is simplified, thus, making it simple to implement the V-MAC in the UE 501.

Next, further description of the VTC provided by the RCA 503 will be described. In order for the UE 501 to relay the MAC layer transport channel frames to the gateway 504, such are relayed to the V-MAC using the VTC of the RCA 503 by having the FRS 502 switch the MAC layer transport channel frames to the VTC which then emulates the transport channels in the UE 501. The VTC may provide, to the MAC of the FRS 502, the following emulated channels: the BCH may be emulated to provide a system ID, a cell ID, and neighbor cell information, which may be preset for the WLAN; the PCH may be emulated when there is an incoming network service session request from the core network, i.e., the MSC/GSN 308 (see FIG. 3) via the gateway 504, wherein the PCH in VTC may include preset paging message information based on the information provided from the gateway 504; the MCH may be emulated when multicast information arrives at the RCA 503 from the core network via the gateway 504; the DCH and/or the SCH may be emulated when signaling data and user data (i.e., user traffic) from UE 501 is sent to the gateway 504 via the DCH and/or the SCH; the FACH and/or the RACH is emulated in order to relay broadcasting information from the gateway 504 to the UE 501 via the MAC layer in the cellular protocol interface as well as to receive an access request message from the MAC layer in cellular protocol interface send it to the V-MAC of the RCA 503 in order to be relayed to the core network via the gateway 504. The MAC layer in cellular protocol interface monitors frame quality and signal quality from physical channel and performs power control, therefore when UE operates over the WLAN, the VTC will provide such link quality information to MAC layer in cellular protocol interface so that the MAC layer make the same operation as it does on cellular radio link, such as MAC layer power control.

When the UE 501 is operating in the WLAN mode, the UE 501 may also perform QoS monitoring and may perform radio link measurements. More particularly, the RCA 503 will determine a radio link status and monitor for responses from the gateway 504 regarding QoS. As such, when the quality of the radio link is below a threshold, the RCA 503 may trigger the VTC to reflect the radio link quality so that cellular protocol interface layer in FRS 502 of the UE 501 sends a radio link measurement report to the gateway 504 in order to initiate a handover procedure. Furthermore, when the UE 501 is operating in the WLAN mode, the RCA 503 start a tunnel with the gateway 504, wherein the gateway 504 allocates tunneling resources for each connecting UE. Accordingly, the traffic between the UE 501 and the gateway 504 will be transported through tunneling, and specifically, through the VTC.

In order to simplify operation of the MAC and the RLC in the FRS 502 and in order to simplify the operation of the V-MAC and the V-RLC in the RCA 503, simple Transport Format (TF) is implemented by the UE 501. When the UE 501 initiates a voice service, voice data is sent through the RLC and the MAC via the FRS 502. Next, the V-RLC in the RCA 503 encapsulates the voice data as a voice data frame using RTP and sends the voice data frame to the gateway 504. The gateway 504 receives the voice data frame and extracts the voice data from the received voice data frame. Next, the gateway 504 encapsulates the extracted voice data using FP to be sent to the MSC/GSN 308 (see FIG. 3). The link between the RLC of the FRS 502 and the V-RLC in the RCA 503 does not have a bandwidth constraint, and thus, a packet size for the RLC is not dynamically changed. Therefore, the RLC and the MAC of the FRS 502 uses one TF, which not only simplifies operation of the RLC and the MAC of the FRS 502, but also simplifies and decreases complexity of the V-MAC and the V-RLC in the RCA 503. When the UE 501 initiates data services, user data is sent as a PDCP frame at a maximum rate through the simple TF, wherein the PDCP frame is transmitted without a PDCP header. The PDCP frame will terminate in the RCA 503, which strips the user data from the PDCP frame in order to relay a pure data payload to the gateway 504 using GTP on a reliable channel between the gateway 504 and the MSC/GSN 208. However, the present invention is not limited thereto, and the PDCP frame may be terminated at the gateway 504 rather than at the RCA 503.

Next, operation of the gateway 504 with respect to the operations of the UE 501, as described above, will be described in further detail. The gateway 504 aggregates all incoming UE connections into one group, which and thus, emulates the operations of one RNC. Furthermore, after a UE, such as the UE 501, joins to the WLAN provided by the WLAN AP which is connected to the gateway 204, the RCA 503 of the UE 501 will initialize a Transport Control Protocol (TCP)/IP connection with the gateway 504. Upon having a TCP/IP connection with the gateway 504, the UE 501 initiates a tunneling procedure between the RCA 503 and the gateway 504 in order to have reliable and secure communications between the UE 501 and the gateway 504. Furthermore, in such a case, the gateway 504 may provide standard cellular network services and functions to the UE 501, such services including registration of the UE 501 on the cellular network, origination of incoming voice calls, termination of outgoing voice calls, handover of the UE 501 between the cellular radio network and the WLAN, data Session activation and deactivation, as well as other similar standard cellular network services.

When the gateway 504 receives a signaling request from the RCA 503, the gateway 504 relays the signaling request to the core network over RANAP, which is a cellular protocol interface between a RNC, which is emulated by the gateway 504, and the MSC/GSN 308. When the gateway 504 receives voice data from the RCA 503, the gateway 504 relays the voice data to the core network via FP, which is a cellular protocol interface between the RNC and the MSC/GSN 308 for voice traffic. When the gateway 204 receives user data from the RCA 503, the gateway 504 relays the user data to the core network via GTP, which is a cellular protocol interface between the RNC and the MSC/GSN 308 for user data. Furthermore, when a voice server or data service session between UE 501 and the gateway 504 is active, the UE 501 will transmit periodic polling information to the gateway 504 in order to determine a WLAN radio link condition, as well as the packets for signaling, voice data and user data, to the gateway 504. In response to the polling information, the gateway 504 may transmit a QoS result through an in-band or an out-of-band connection to the UE 501. Based on the determined WLAN radio link condition, the gateway 504 may initiate a hard handover in order to transfer the radio link session between the cellular network and the WLAN.

Figure 6:
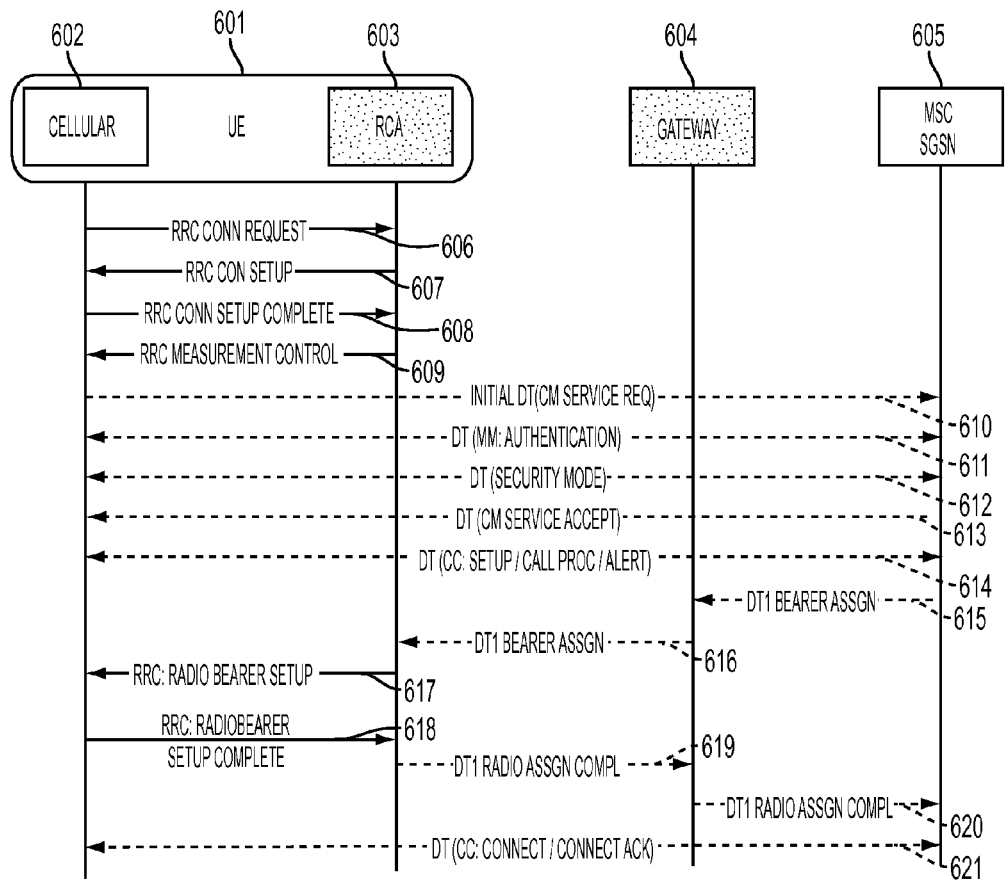
FIG. 6 illustrates a signaling flow chart for a UE originating a voice call over the WLAN according to an exemplary embodiment of the present invention.

FIG. 6 illustrates a signaling flow chart for a UE originating a voice call over the WLAN according to an exemplary embodiment of the present invention.

Referring to FIG. 6, when the UE 601 initiates a voice call over the WLAN, the UE 601 transmits an RRC Connection Request from a FRS 602 in step 606, wherein the RRC Connection Request is intended for the core network, and is thus intercepted by the RCA 603 of the UE 601. More particularly, the FRS 602 reroutes a signaling frame having the RRC Connection Request to a VTC of the RCA 603, and the RCA 603 terminates the RRC Connection Request. Because cellular radio resources are not used for the voice call, there is no need to perform cellular resource allocation, and thus, in step 607, the RCA 603 may return an RRC Connection Setup message to the RRC layer in the FRS 602 according to predetermined parameters. After receiving the RRC Connection Setup message in step 607, the UE 601 transmits an RRC Connection Complete message from the FRS 602 to the RCA 603 in step 608. In order to emulate a cellular radio network, the RCA 603 transmits an RRC Measurement Control request to UE 601 in step 609 so that the UE 601 reports a change in network link conditions to the core network. Next, the UE 601 performs NAS signaling, and in step 608, the UE 601 transmits an Initial Direct Transfer (DT) message, including a Connection Management (CM) service request, to the core network.

Because the Initial DT message and all NAS signaling messages are relayed to the core network in a cellular network, the RCA 603 relays the Initial DT message to the gateway 604 in step 610, which relays the Initial DT message to the MSC/GSN 605 via a RAN Protocol (RANP) interface over a Signaling System 7 (SS7) signaling trunk. Next, the MSC/GSN 605 performs a UE 601 identification process by exchanging DT Mobility Management (MM) Authentication messages between the UE 601 and the MSC/GSN 605 in step 611. Next, in step 612, the UE 601 and the MSC/GSN 605 exchange DT Security Mode messages to verify security with the UE 601. After, the authorization and the security process between the UE 601 and the MSC/GSN 605 in steps 611 and 612, the MSC/GSN 605 transmits a DT CM Service Accept message to the UE 601 in step 613.

In step 614, the UE 601 sends a DT Call Setup message to the MSC/GSN 605 in order to start a call session, and then transmits a DT Call Proceed message and a DT Alert message to the MSC/GSN 605. Next, the MSC/GSN 605 assigns an open voice trunk for the voice call, and in step 615, the MSC/GSN 605 transmits a Radio Bearer Assignment request to RCA 603 via the gateway 604 so that the gateway 604 and the MSC/GSN 605 have the open voice trunk between them. In step 616, the gateway 604 relays the Radio Bearer Assignment message to RCA 603, and the gateway 604 changes the open voice trunk from a signaling mode to a voice mode.

After receiving a confirmation of the change to voice mode for the voice trunk, the RCA 603 transmits a RRC Radio Bearer Setup message to the FRS 602 of the UE 601 in step 617. Accordingly, the UE 501 may perform voice data framing, and thus, sends an RRC Radio Bearer Setup Complete message to the V-RRC of the RCA 603 in step 618. Next, in step 619, the RCA 603 relays a DT Radio Assignment Complete message to the gateway 604. Upon receiving the DT Radio Assignment Complete message, the gateway 604 makes a corresponding state change and relays the DT Radio Assignment Complete message to the MSC/GSN 605 in step 620. Next, in step 621, and upon completion of the above described voice call initiation procedure for a voice call over the WLAN, the UE 601 may conduct the voice call using the WLAN rather than the cellular network, thus reducing use of cellular network resources according to the present exemplary embodiment of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a voice call service for a cellular network seamlessly through a Wireless Local Area Network (WLAN), the WLAN including a WLAN Access Point (AP) and a gateway, to a User Equipment (UE) having a Frame Route Switch (FRS) and a Radio Control Agent (RCA), the method comprising:

performing a cellular network resource assignment by the RCA of the UE after receiving a radio resource request message from the FRS of the UE;

transmitting, via a gateway of the WLAN to which the RCA is connected, an initial Direct Transfer (DT)-Connection Management (CM) service request from the FRS to a Mobile Switching Center/General Packet Radio Service (GPRS) Support Node (MSC/GSN), in order to request call setup with the cellular network;

executing an authentication and security procedure between the FRS and the MSC/GSN via the gateway of the WLAN;

provisioning a voice trunk, by the MSC/GSN, for a voice call from the UE using the cellular network;

transmitting, from the MSC/GSN to the gateway of the WLAN, a radio bearer assignment request message for requesting the gateway to open a voice trunk between the gateway and the MSC/GSN;

transmitting, from the gateway to the RCA, the radio bearer assignment request message to the RCA in order to switch a connection between the RCA and the gateway from a signaling mode to a voice mode;

transmitting, from the RCA to the FRS, a radio bearer setup message, upon receiving the radio bearer assignment request message from the gateway;

transmitting, from the FRS to the RCA, a radio bearer setup complete message;

and transmitting, from the RCA to the MSC/GSN via the gateway, a DT radio bearer assignment complete message in order to complete the voice call setup signaling and to establish the voice call connection.

2. The method of claim 1, wherein communications between the RCA and the gateway is provided by a tunnel between the RCA and the gateway.

3. The method of claim 2, wherein the tunnel is generated using GPRS Tunneling Protocol (GTP).

4. The method of claim 1, wherein the performing of the cellular network resource assignment comprises:

transmitting, upon receiving a request for generating a voice call on the UE, a radio link connection request from the FRS to the RCA in order to request radio resources for the voice call;

transmitting, upon receiving the radio link connection request, a radio resource assignment completion message from the RCA to the FRS in order to indicate assignment of radio resources;

transmitting, upon receiving the radio resource assignment completion message, a confirmation message confirming the assignment of the radio resources from the FRS to the RCA;

transmitting, upon receiving the confirmation message, a measurement control request message from the RCA to the FRS in order to request the FRS to report a change in a network link condition, the change in the network link condition being detected by the FRS; and transmitting, from the FRS to a Mobile Switching Center/General Packet Radio Service (GPRS) Support Node (MSC/GSN), an initial Direct Transfer (DT)-Connection Management (CM) service request in order to request call setup with the cellular network.

5. The method of claim 1, wherein the UE transmits all messages to be transmitted via a cellular network through the FRS of the UE to the RCA of the UE.

6. The method of claim 1, wherein the UE transmits signaling data for the voice call and voice data for the voice call via the WLAN to a core network of the cellular network.

7. The method of claim 1, further comprising providing the WLAN via a WLAN Access Point (AP) disposed between the UE and the gateway.

8. A User Equipment (UE) providing cellular communications services via a Wireless Local Area Network (WLAN), the UE comprising:

a cellular communications unit including a cellular network protocol interface, a Frame Relay Switch (FRS), and a cellular modem; and a WLAN communications unit including a WLAN modem and a Radio Control Agent (RCA), wherein the RCA provides a communications tunnel between the cellular communications unit and a gateway of the WLAN, and wherein the cellular network protocol interface comprises:

a first Network Access Stratum (NAS) layer of the UE for communicating NAS messages with a second NAS layer of a cellular network:

a first Radio Resource Control (RRC) layer for communicating RRC messages with a second RRC layer of the RCA;

a first Radio Link Control (RLC) layer for communicating RLC messages with a second RLC layer of the RCA; and a first Media Access Control (MAC) layer for communicating MAC messages with a second MAC layer of the RCA, wherein the RCA terminates messages transmitted from the first RRC layer, the first RLC layer, and the first MAC layer in the RCA.

9. The UE of claim 8, wherein the communications tunnel is generated using General Packet Radio Service (GPRS) Tunneling Protocol (GTP).

10. The UE of claim 8, wherein the FRS relays messages originating from the cellular network protocol interface to the RCA.

11. The UE of claim 8, wherein the RCA forwards messages generated by the first NAS layer to the second NAS layer of the cellular network via the communications tunnel between the cellular communications unit and the gateway of the WLAN.

12. The UE of claim 8, wherein the RCA responds to the terminated messages from the first RRC layer, the first RLC layer, and the first MAC layer by transmitting response messages respectively from the second RRC layer, the second RLC layer, and the second MAC layer.

13. The UE of claim 8, wherein the cellular protocol interface further comprises:

a first Packet Data Convergence Protocol (PDCP) layer for communicating PDCP messages having at least one of voice data and user data to a second PDCP layer of the gateway of the WLAN; and a first Real-time Transport Protocol (RTP) layer for communicating RTP messages with a second RTP layer of the gateway of the WLAN.

14. A wireless communication system including a cellular network and a Wireless Local Area Network (WLAN) providing cellular network services via the WLAN, the system comprising:

a Radio Access Network (RAN) providing the cellular network;

a WLAN Access Point (AP) providing the WLAN;

a Mobile Switching Center/General Packet Radio Service (GPRS) Support Node (MSC/GSN) providing a connection to a core network of the cellular network;

a gateway connecting the WLAN AP to the MSC/GSN; and a User Equipment (UE) accessing both the cellular network provided by the RAN and the WLAN provided by the WLAN AP, the UE comprising:

a cellular communications unit including a cellular network protocol interface, a Frame Relay Switch (FRS), and a cellular modem; and a WLAN communications unit including a WLAN modem and a Radio Control Agent (RCA), wherein the RCA provides a communications tunnel between the cellular communications unit and a gateway of the WLAN.

15. The system of claim 14, wherein data corresponding to the cellular network services provided through the cellular modem are routed to the RCA by the FCS of the cellular communications unit of the UE.

16. The system of claim 14, wherein the RCA transmits data corresponding to the cellular network services to the MSC/GSN via a tunnel provided through the WLAN AP to the gateway.

17. The system of claim 16, wherein the tunnel is generated using GPRS Tunneling Protocol (GTP).

18. The system of claim 16, wherein the gateway receives voice data and receives user data transmitted from the core network to the UE via the MSC/GSN,
wherein the received voice data and the received user data corresponds to the cellular network services, and
wherein the gateway forwards the received voice data and user data to the UE via the tunnel provided through the WLAN AP.

19. The system of claim 16, wherein the RCA performs a Radio Resource Control (RRC) connection setup upon the cellular network protocol interface requesting cellular network radio resources for providing cellular network services to the UE.

* * * * *